A. THOMAS.
Tool Rest.

No. 107,564. Patented Sept. 20, 1870.

Witnesses,
Thos. H. Dodge
Chas. A. Burleigh

Inventor
Alfred Thomas

United States Patent Office.

ALFRED THOMAS, OF WORCESTER, MASSACHUSETTS.

Letters Patent No. 107,564, dated September 20, 1870.

IMPROVEMENT IN TOOL-RESTS.

The Schedule referred to in these Letters Patent and making part of the same.

*To all whom it may concern:*

Be it known that I, ALFRED THOMAS, of the city and county of Worcester, State of Massachusetts, have invented certain new and useful Improvements in Tool-Rests for Lathes; and I do hereby declare the following to be a full, clear, and exact description of the same, reference being had to the accompanyng drawing forming part of this specification, in which—

Figure 2:
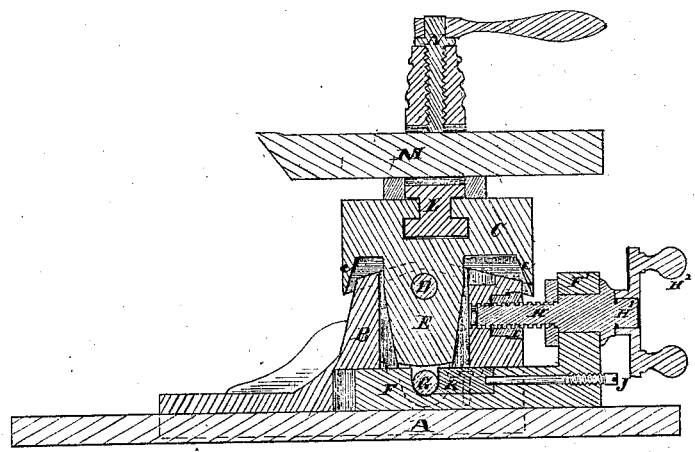
Figure 2 represents a central vertical section on line A B, fig. 1.
Figure 1:
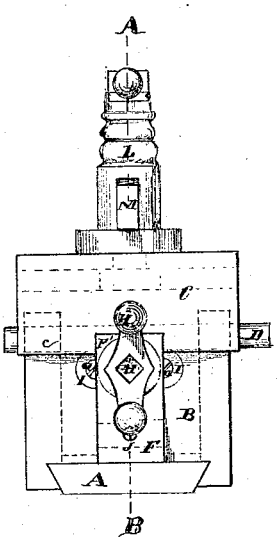
Figure 1 represents a rear view of my improved tool-rest.

To enable those skilled in the art to which my invention belongs to make and use the same, I will proceed to describe it more in detail.

The nature of my invention consists in certain improvements in adjustable tool-rests, as hereinafter explained.

In the drawing—

The part marked A represents the flanged top of the carriage, upon which is supported the head-block B, as indicated.

A rocking cap, C, is arranged at the top of the head-block B, to which it is pivoted by a spindle, D, that passes through the downward-projecting center piece E of the cap C and upper part of the head-block B, in such a manner that the cap C will rock back and forth with the motion of the slide F, to which it is joined for operation by means of a spindle, G, arranged in the lower end of the center piece E, and which spindle fits into a transverse groove, formed in the top of the slide-bar F.

The slide F is run in and out by a screw, H, arranged in the upward-projecting end F' of said slide, as indicated.

The head H¹ of the screw is squared, to receive the wrench or handle H², by means of which the screw is turned.

A bearing-plate, I, is fitted into the side of the head-block B, through which the screw H passes, and, should the thread of said screw, at any time, become worn away, so that the parts work too loosely, by turning in the screws *a*, which hold the plate I to the head-block, all back-lash upon the thread is taken up, and the parts are caused to work close and tight again.

The recess formed in the head-block for the bearing-plate is of greater depth than the said plate, in order to allow the latter to be set back therein, when necessary, as just described.

An adjusting-block, K, is arranged on the slide F, back of the spindle G, for the purpose of taking up any space caused by the wearing away of the spindle G, or the sides of the groove in which it works.

The block K is secured to the slide F by clamp-screws, which pass through slots in the back, and screw into the slide F, while a screw, J, is arranged longitudinally through the slide F, by means of which the block K may be moved forward, all of which is fully indicated in the drawing.

Flanges *c* are formed around the cap C, which project downward around the top of the head-block B, to keep the chips and dust from the interior.

The center piece E is fitted closely between the sides of the head-block, so that there will be no lateral motion between said parts.

The cap C is provided with a flanged lateral groove in its top, in which is secured the clamp-spindle L, in which the tool M is fixed, it being held in position by the set-screw N, in the ordinary manner.

In lieu of the spindle D gudgeons may be formed at the under side of the cap C, for supporting it upon the head-block B, or adjustable center bearings may be arranged through the sides of the cap, which can be screwed in as the bearings wear loose.

Having described my improvements in tool-rests for lathes,

What I claim therein as new and of my invention, and desire to secure by Letters Patent, is—

1. The combination, with the rocking caps C and center piece E, of the slide F, the head-block B, and the screw H, substantially as and for the purposes set forth.

2. The movable slide F, provided with an adjusting-block, K, and set-screw J, in combination with the head-block B, rocking cap C, and spindle G, substantially as and for the purposes set forth.

3. The construction of the recess in the head-block, for the accommodation of the bearing-plate or nut, of a depth greater than the nut, in order to obtain space, into which the nut may be forced, as the threads of the screw or nut, or of both, become worn.

4. The combination, with the head-block B, cap-piece C E, and slide F, of the spindles D G, screws H J, adjustable bearing-plate I, and bearing-block K, said parts being construbted and arranged, in relation to each other, substantially as shown and described.

ALFRED THOMAS.

Witnesses:
THOS. H. DODGE,
CHAS. H. BURLEIGH.